(12) United States Patent
Wei et al.

(10) Patent No.: US 11,702,807 B1
(45) Date of Patent: Jul. 18, 2023

(54) SYSTEMS AND METHODS FOR A SNOW BLOWER SENSOR

(71) Applicants: SNAKE RIVER MANUFACTURING, Heyburn, ID (US); CHANG INDUSTRIAL, Jacksonville Beach, FL (US)

(72) Inventors: Timothy Wei, Heyburn, ID (US); Grant Flaharty, Heyburn, ID (US); Matthew Chang, Heyburn, ID (US)

( * ) Notice: Subject to any disclaimer, the term of this patent is extended or adjusted under 35 U.S.C. 154(b) by 0 days.

(21) Appl. No.: 17/865,231

(22) Filed: Jul. 14, 2022

(51) Int. Cl.
*E01H 5/09* (2006.01)
*G01F 1/05* (2006.01)
*E01H 5/04* (2006.01)

(52) U.S. Cl.
CPC ............ *E01H 5/098* (2013.01); *E01H 5/045* (2013.01); *G01F 1/05* (2013.01)

(58) Field of Classification Search
CPC .. E01H 5/00; E01H 5/04; E01H 5/045; E01H 5/076; E01H 5/08; E01H 5/09; E01H 5/098; G01F 1/05
See application file for complete search history.

(56) References Cited

U.S. PATENT DOCUMENTS

| | | | |
|---|---|---|---|
| 2007/0022636 A1* | 2/2007 | Wakitani | E01H 5/04 37/245 |
| 2016/0244925 A1* | 8/2016 | Yuki | E01H 5/045 |
| 2019/0031099 A1* | 1/2019 | Kimura | E01H 5/061 |
| 2019/0323190 A1* | 10/2019 | Waelbers | G05D 1/0011 |

* cited by examiner

*Primary Examiner* — Jamie L McGowan
(74) *Attorney, Agent, or Firm* — Holland & Hart LLP

(57) ABSTRACT

A snow blower including an auger housing, an auger rotatably positioned within the auger housing and configured to blow snow, a shaft attached to the auger and the auger housing, a chute attached to the auger housing and configured to direct the snow blown by the auger away from the snow blower, and at least one sensor configured to detect at least one of a rotational speed of the auger or the shaft and a load, torque, and/or thrust on the shaft or the auger housing. The data collected by the at least one sensor is used to determine an instantaneous flow rate of snow.

20 Claims, 5 Drawing Sheets

SYSTEMS AND METHODS FOR A SNOW BLOWER SENSOR

TECHNICAL FIELD

The present disclosure relates generally to snow blowers, and more particularly relates to systems and methods for a snow blower sensor.

BACKGROUND

Typical commercial or larger-scale snow blower systems often include a vehicle and a snow blower attached to a front of the vehicle or integrally formed to the front of the vehicle. The vehicle typically includes a drive train including an engine or motor and a plurality of gears, belts, shaft(s), and/or other components that transmit power from the engine to the snow blower. The snow blower also includes an auger, an auger housing, at least one bearing for rotatably maintaining the auger within the auger housing, and a chute for discharging snow from the auger housing. Customers of large commercial snow blowers require quantitative specifications for how much snow a unit can remove measured in tons of snow per hour (i.e., flow rate). The current best practice for measuring snow flow rate is to place a blower in a body of water and 'blow' water into a collecting tank where the rate at which the tank fills is the specified flow rate. Aside from the fact that drawing water from a reservoir is not the same as blowing snow, this method does not account for the fact that the properties of snow (and ice) can be highly variable. In addition, it is a time averaged measurement method and does not provide information about instantaneous flow rate.

For at least the foregoing reasons, there is a need to provide improved methods of detecting an instantaneous flow rate of snow blown from a snow blower.

SUMMARY

One aspect of the present disclosure relates to a snow blower including an auger housing, an auger rotatably positioned within the auger housing and configured to blow snow, a shaft attached to the auger and the auger housing, a chute attached to the auger housing and configured to direct the snow blown by the auger away from the snow blower, and at least one sensor configured to detect at least one of a rotational speed of the auger or the shaft and a load, torque, and/or thrust on the shaft or the auger housing. The data collected by the at least one sensor is used to determine an instantaneous flow rate of snow.

Another aspect of the present disclosure relates to a snow blower system including a vehicle and a snow blower attached to the vehicle. The snow blower includes an auger housing, an auger rotatably positioned within the auger housing and configured to blow snow, a shaft attached to the auger and the auger housing, a chute attached to the auger housing and configured to direct the snow blown by the auger away from the snow blower, and at least one sensor configured to detect at least one of a rotational speed of the auger or the shaft and a load, torque, and/or thrust on the shaft or the auger housing. The data collected by the at least one sensor is used to determine an instantaneous flow rate of snow.

The present disclosure is further directed to a method of determining an instantaneous flow rate of snow blown from a snow blower. The snow blower includes an auger housing, an auger rotatably positioned within the auger housing and configured to blow snow, a shaft attached to the auger and the auger housing, a chute attached to the auger housing and configured to direct the snow blown by the auger away from the snow blower, and at least one sensor. The method includes rotating the shaft and the auger within the auger housing. The method also includes blowing snow using the auger within the auger housing. The method further includes directing the snow out of the auger housing using the chute. The method also includes detecting at least one of a rotational speed of the auger or the shaft and a load, torque, and/or thrust on the shaft or the auger housing using the at least one sensor. The method further includes determining the instantaneous flow rate of the snow using the data collected by the at least one sensor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label.

Figure 1:
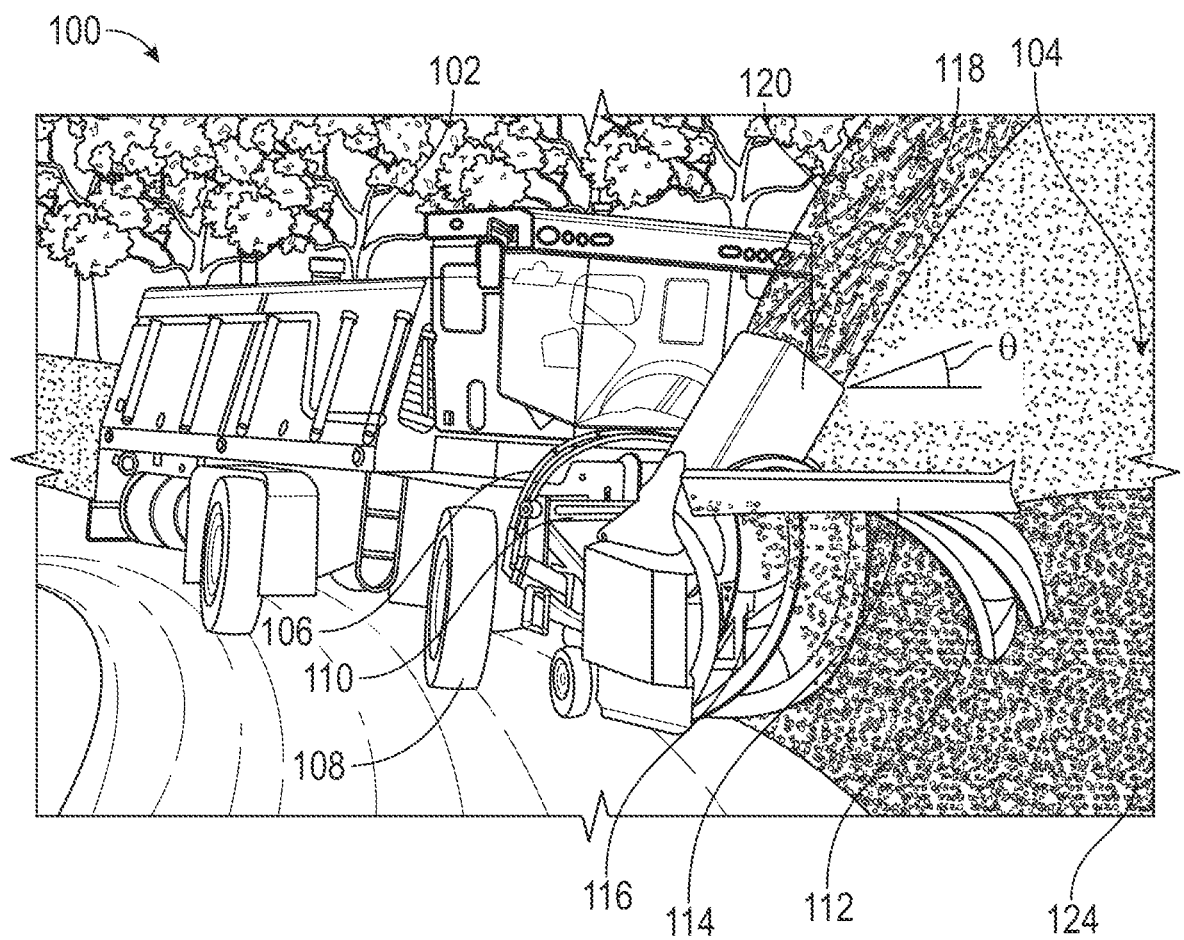
FIG. 1 is a perspective view of an example of a system for blowing snow in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure include methods and systems for snow blower flow rate detection. More specifically, embodiments of the present disclosure include methods and systems for snow blower flow rate detection using a direct sensor-based measurement system. Large-scale snow blower systems typically include a vehicle and a snow blower attached to the vehicle. The vehicle typically includes a drive train including an engine or motor and a plurality of gears, belts, shaft(s), and/or other components that transmit power from the engine to the snow blower. The snow blower also includes an auger, an auger housing, at least one bearing for rotatably maintaining the auger within the auger housing, and a chute for discharging snow from the auger housing.

Customers of large commercial snow blowers require quantitative specifications for how much snow a unit can remove measured in tons of snow per hour (i.e., flow rate). The current best practice for measuring snow flow rate is to place a blower in a body of water and 'blow' water into a collecting tank where the rate at which the tank fills is the specified flow rate. Aside from the fact that drawing water from a reservoir is not the same as blowing snow, this method does not account for the fact that the properties of snow (and ice) can be highly variable. In addition, it is a time averaged measurement method and does not provide information about instantaneous flow rate.

The systems and methods described herein may accurately determine a flow rate of the snow blower by placing at least one sensor in the snow blower and determining the flow rate of the snow blower based on the data obtained from the at least one sensor. Specifically, in some embodiments, the systems and methods described herein include a first sensor positioned proximate the at least one bearing for determining the thrust of the snow on the at least one bearing. The systems and methods described herein may further include a second sensor positioned proximate the auger that measures the rotational speed of the auger. The systems and methods described herein then calculate the flow rate of the snow blower by dividing the thrust determined by the first sensor by the rotational speed of the auger determined by the second sensor.

This is a first-principles solution to measuring flow rate from a snow blower that is based on the integral form of the momentum equation in fluid dynamics—a specific statement of Newton's 2nd law of motion. In this formulation, the thrust generated by the blower launching a jet of snow is equal to the mass flow rate of the snow multiplied by the speed of the snow jet. The systems and methods described herein are a direct physics-based measurement (as opposed to an empirical measurement with all the associated limitations) that automatically accounts for variability of the snow and provides for an instantaneous measurement which allows for a wide variety of data applications. Accordingly, the systems and methods described herein include a sensor system for a snow blower that provides instantaneous flow rate measurements.

FIG. 1 illustrates a system 100 for blowing snow. In the illustrated embodiment, the system 100 is a large commercial snow blower that is used to clear streets, runways, sidewalks, and/or other large areas of snow. In alternative embodiments, the system 100 may also include smaller residential snow blowers used to clear driveways, sidewalks, and/or other smaller areas of snow. In the illustrated embodiment, the system 100 includes a vehicle 102 and a snow blower 104. In the illustrated embodiment, the vehicle 102 is a truck and the snow blower 104 is an auger snow blower attached to the vehicle 102. That is, in the illustrated embodiment, the vehicle 102 and the snow blower 104 are separate components and the vehicle 102 pushes the snow blower 104 during operations. In alternative embodiments, the vehicle 102 may be any type of vehicle that enables the systems and methods to operate as described herein and the snow blower 104 may be any type of snow blower that enables the systems and methods described herein to operate as described herein. For example, in some embodiments, the vehicle 102 and the snow blower 104 may be combined into a single self-propelled snow blower.

The vehicle 102 includes a motor 106, wheels 108, and an attachment 110. The motor 106 powers the wheels 108 to propel the vehicle 102 and the snow blower 104 forward. Additionally, the motor 106 may also provide power to the snow blower 104 through the attachment 110, which attaches the snow blower 104 to the vehicle 102. Specifically, the attachment 110 may be a shaft (not shown) that is attached to a corresponding shaft (not shown) on the snow blower 104 and rotation of the vehicle shaft rotates the corresponding shaft of the snow blower. The corresponding shaft powers portions of the snow blower 104 as described below. Thus, the vehicle 102 provides motive force for the snow blower 104 to move the snow blower 104 and provides power to operate portions of the snow blower 104.

The snow blower 104 includes an auger 112, an auger housing 114, at least one bearing or shaft 116 for rotatably maintaining the auger 112 within the auger housing 114, and a chute 118 for discharging snow from the auger housing 114. The snow blower 104 is pushed by the vehicle 102 and the auger 112 rotates within the snow blower 104. The auger 112 contacts and breaks up the snow and rotates the snow within the auger housing 114. The auger housing 114 prevents the snow from flying indiscriminately away from the auger 112 and channels the snow into the chute 118. The chute 118 channels the moving snow away from the auger housing 114, through the chute, from which it is expelled to a location external to the snow blower as directed by the operator.

As shown in FIG. 1, the chute 118 may be moved to different locations and/or positions to direct the snow to the location. Specifically, the chute 118 defines an exit opening 120 that is moved to different locations and/or positions to direct the snow from the snow blower as it is expelled. More specifically, the exit opening 120 is rotated and/or moved such that the snow is directed away from the snow blower 104 to the location. Additionally, the exit opening 120 is rotated and/or moved such that the snow exiting from the exit opening 120 defines an angle θ relative to the horizontal and/or ground 124. As such, the chute 118 may be moved to different locations and/or positions to direct the snow to the location.

Figure 2:
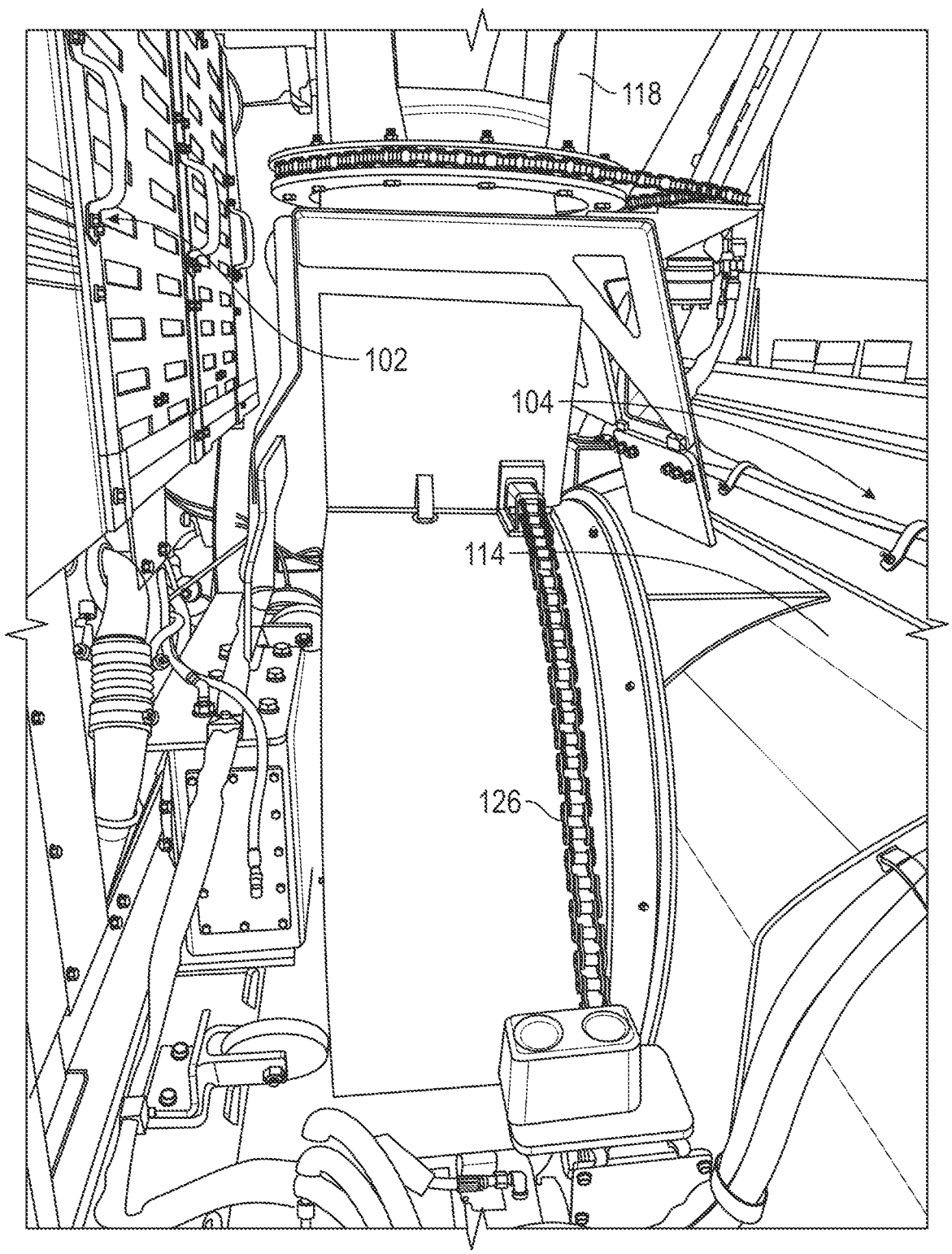
FIG. 2 is another perspective view of the system for blowing snow shown in FIG. 1 in accordance with the present disclosure.

FIG. 2 is a perspective view of a portion of the system 100 for blowing snow. As shown in FIG. 2, in some embodiments, the snow blower 104 may include additional supports 126 that enable the auger 112 (shown in FIG. 1), the auger housing 114, the at least one bearing or shaft 116 (shown in FIG. 1), and the chute 118 to remain in a predetermined position relative to each other as the snow is blown from the snow blower 104. The snow blower 104 generates a substantial amount of torque or thrust in response to the snow being blown from the snow blower 104. The support 126 counteracts the torque or thrust generated by the snow and maintains the auger 112, the auger housing 114, the at least one bearing or shaft 116, and the chute 118 in position. In the illustrated embodiment, the support 126 includes a chain wrapped around a portion of the auger housing 114. In alternative embodiments, the support 126 may be any type of support that enables the snow blower 104 to operate as described herein.

Figure 3:
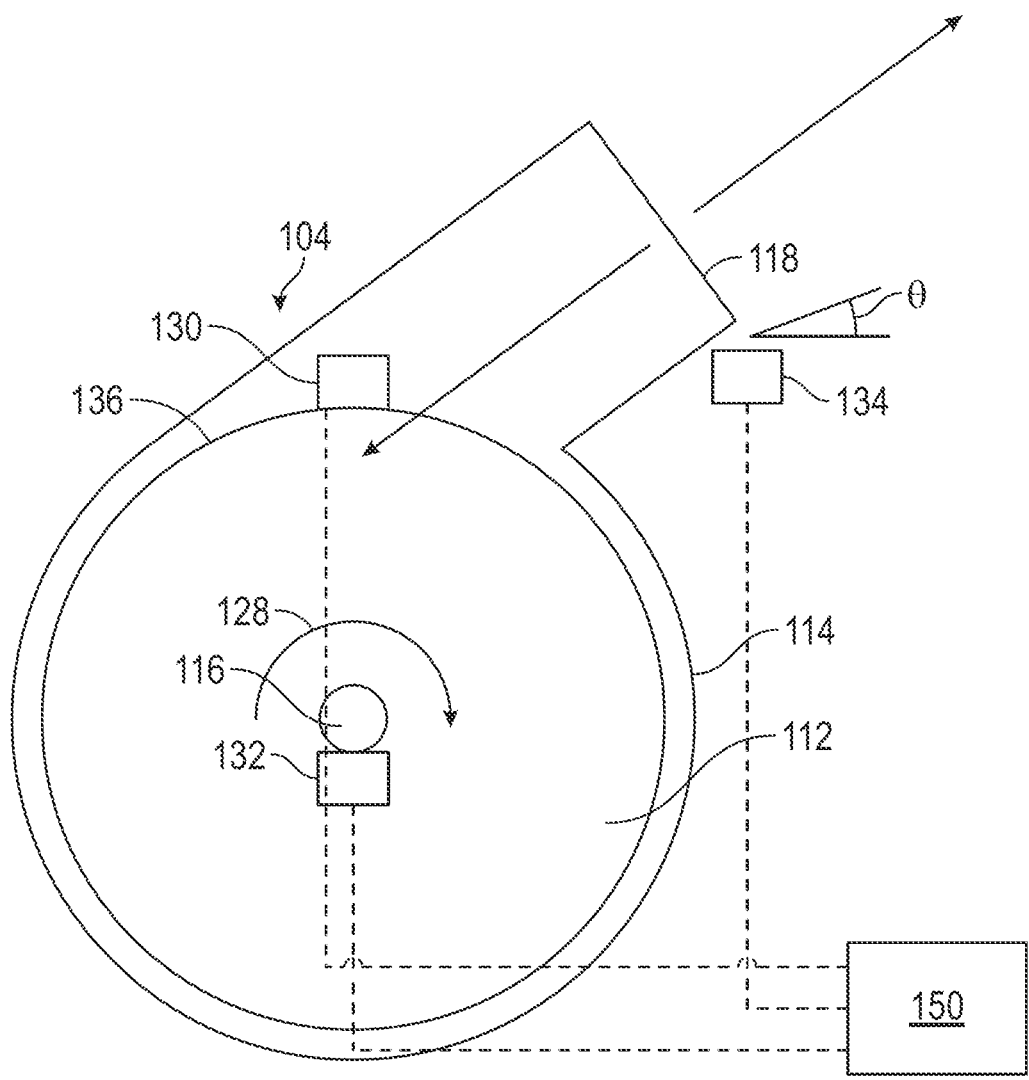
FIG. 3 is a simplified schematic diagram of the snow blower shown in FIGS. 1 & 2 in accordance with the present disclosure.

FIG. 3 is a simplified schematic diagram of the snow blower 104. As shown in FIG. 3, the auger 112 rotates in a rotational direction 128 within the auger housing 114 and the at least one bearing or shaft 116 rotates the auger 112 within the auger housing 114. The chute 118 discharges snow from the auger housing 114 at various angles. The snow blower 104 may further include at least one sensor 130, 132, and 134 In the illustrated embodiment, the snow blower 104 includes a plurality of sensors 130, 132, and 134. More specifically, in the illustrated embodiment, the snow blower 104 includes a first sensor 130, a second sensor 132, and a third sensor 134. In alternative embodiments, the snow blower 104 may include any number of sensors 130, 132, and 134 that enable the snow blower 104 to operate as described herein. For example, the snow blower 104 may include one, two, three, or more sensors 130, 132, and 134 to enable the snow blower 104 to operate as described herein.

In the illustrated embodiment, the first sensor 130 includes at least a rotational speed sensor that is configured to measure the rotational speed of at least one of the auger 112 and the at least one bearing or shaft 116. The rotational speed sensor determines the velocity of the snow blown from the snow blower 104 by determining the rotational speed of the auger 112 at an edge 136 of the auger 112. More specifically, the magnitude of the velocity of the snow blown from the snow blower 104 is the same as the rotational speed of the edge 136 of the auger 112. Thus, the first sensor 130 enables the snow blower 104 to detect the velocity of the snow blown from the snow blower 104. The first sensor 130 may be any type of rotational speed sensor that enables the snow blower 104 to operate as described herein. For example, the first sensor 130 may be an optical sensor, a hall-effect sensor, an inductive sensor, an oscillatory sensor, a magneto-resistive sensor, an eddy current sensor, a proximity switch, and/or any other type of sensor. In the illustrated embodiment, the first sensor 130 includes an optical sensor.

In the illustrated embodiment, the second sensor 132 includes at least a load sensor that is configured to measure the load, torque, and/or thrust on a portion of the snow blower 104. The load, torque, and/or thrust on a portion of the snow blower 104 is then used in the calculation described below to determine the flow rate of the snow blown from the snow blower 104. Specifically, the flow rate of the snow blown by the snow blower 104 may be calculated by dividing the thrust determined by the second sensor 132 by the rotational speed of the auger 112 determined by the first sensor 130. Thus, the second sensor 132 enables the snow blower 104 to detect the load, torque, and/or thrust on a portion of the snow blower 104 to calculate the flow rate of the snow blown by the snow blower 104. The second sensor 132 may be any type of load, torque, and/or thrust sensor that enables the snow blower 104 to operate as described herein. For example, in the illustrated embodiment, the second sensor 132 includes a load sensor.

The second sensor 132 may be located in any portion of the snow blower 104 that enables the snow blower 104 to operate at least one bearing or shaft 116 at least one bearing or shaft 116 as described herein. In the illustrated embodiment, the second sensor 132 is positioned proximate the at least one bearing or shaft 116 to measure the load, torque, and/or thrust on the at least one bearing or shaft 116. In an alternative embodiment, the second sensor 132 may be positioned proximate the additional support 126 (shown in FIG. 2) to measure the load, torque, and/or thrust on the additional support 126. When snow is being blown from the snow blower 104, a torque will be generated by the snow that will exert a torque on the auger housing 114. The additional supports 126 will counter the torque exerted by the snow with a force proportional to the torque generated by the snow. In the embodiment illustrated in FIG. 2, the additional support 126 is a chain wrapped around the auger housing 114. Because the chain is wrapped around the auger housing 114, regardless of the angle at which the chute 118 is oriented, the tension in the chain will always be proportional to the thrust with a fixed proportionality constant. Thus, in some embodiments, the angle of the chute 118 may not be required to calculate the flow rate of the snow as described below.

The system may further include a third sensor 134 which includes at least an angle sensor to determine an angle θ of the chute 118. As described below, in some embodiments, the angle θ of the chute 118 may be required to determine the flow rate of the snow as described below. In the illustrated embodiment, the third sensor 134 is positioned proximate the chute 118 to measure the angle of the chute 118. In alternative embodiments, the third sensor 134 may be positioned at any location on the snow blower 104 that enables the snow blower 104 to operate as described herein. In the illustrated embodiment, the third sensor 134 includes a position sensor. In alternative embodiments, the third sensor 134 may be any type of sensor that enables the snow blower 104 to operate as described herein.

Figure 4:
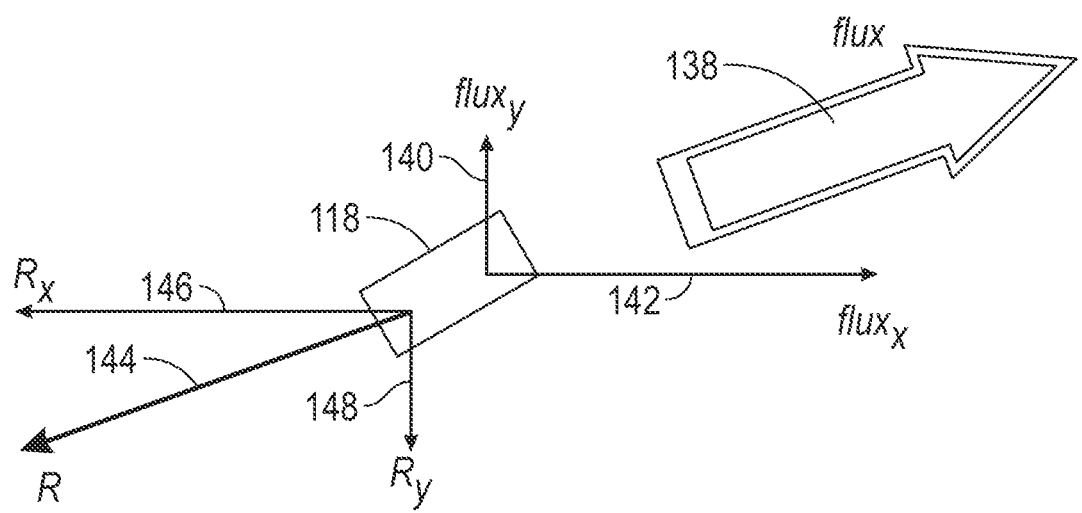
FIG. 4 is a force diagram of a flow of snow being blown from the chute of the system shown in FIG. 1 in accordance with the present disclosure.

FIG. 4 is a force diagram of a flow of snow being blown from the chute 118. The snow has a momentum flux 138, an x-component 140 of the momentum flux 138, and a y-component 142 of the momentum flux 138. A reaction force 144 is generated in response to the momentum flux 138 that is equal and opposite to the momentum flux 138 in accordance with Newton's laws. The reaction force 144 has an x-component 146 of the reaction force 144 and a y-component 148 of the reaction force 144. A simplified force balance is shown in Eqn. 1 below:

$$R = \rho V^2 A \qquad \text{Eqn. 1}$$

Where R is the magnitude of the reaction force 144, ρ is the density of the snow, V is the velocity of the snow as determined by the first sensor 130, and A is the area of the exit opening 120 of the chute 118.

In the x-direction, Eqn. 1 is reduced to Eqn. 2 shown below:

$$R_x = \rho V^2 A \cos\theta \qquad \text{Eqn. 2}$$

Where Rx is the x-component 146 of the reaction force 144 and θ is the angle θ of the chute 118. Mass flow rate is equal to the density of the snow (ρ) multiplied by the velocity of the snow (V) multiplied by the area of the exit opening 120 of the chute 118 (A) as shown in Eqn. 3 below:

$$\dot{M} = \rho V A \qquad \text{Eqn. 3}$$

Where M is the mass flow rate of the snow.

When Eqn. 3 is substituted into Eqn. 2, the mass flow rate is related to the x-component 146 of the reaction force 144 as shown in Eqn. 4 below:

$$R_x = \dot{M} V \cos\theta \qquad \text{Eqn. 4}$$

Eqn. 5 below shows Eqn. 4 solved for the mass flow rate:

$$\dot{M} = \frac{R_x}{V \cos\theta} \qquad \text{Eqn. 5}$$

Additionally, in some embodiments, the snow blower 104 may include a computing device 150 and the first sensor 130, the second sensor 132, and the third sensor 134 may be communicatively coupled to the computing device 150. That is, the first sensor 130, the second sensor 132, and the third sensor 134 detect the speed of the snow, the load, torque, and/or thrust on the system, and the angle θ of the chute 118 and communicate those values to the computing device 150 and the computing device 150 computes the flow rate of the snow using Eqn. 5 shown above. In the illustrated embodiment, the computing device 150 is a processor that is contained within the snow blower 104 and/or the vehicle 102. In an alternative embodiment, the computing device 150 may be a laptop computer, a smart phone, a tablet, or some other computing device that is separate from the snow blower 104 and/or the vehicle 102.

Figure 5:
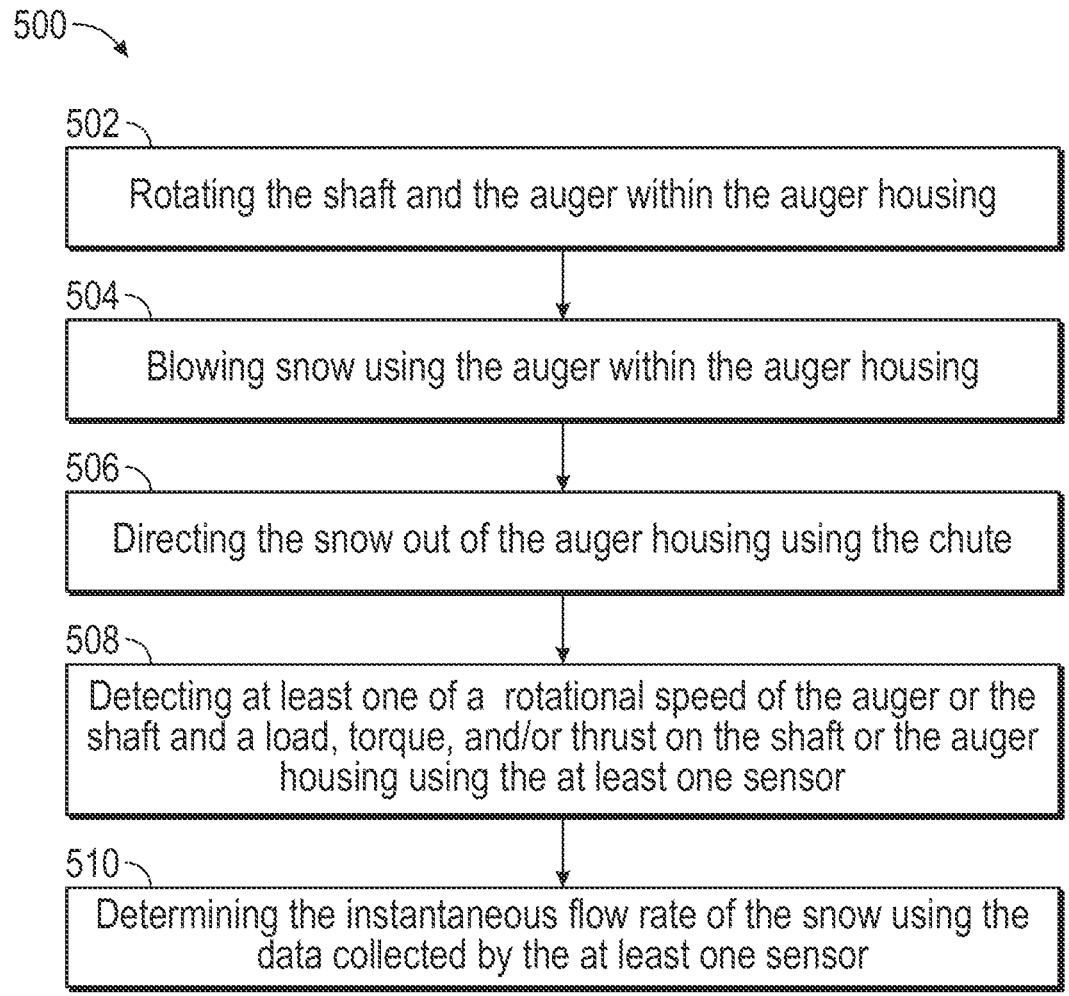
FIG. 5 illustrates a flow diagram of a method of determining a flow rate of snow blown from the snow blower system shown in FIG. 1 in accordance with the present disclosure.

FIG. 5 is a flow diagram of a method 500 of determining a flow rate of snow blown from a snow blower. The snow blower includes an auger housing, an auger rotatably positioned within the auger housing and configured to blow snow, a shaft attached to the auger and the auger housing, a chute attached to the auger housing and configured to direct the snow blown by the auger away from the snow blower, and at least one sensor. The method 500 includes rotating 502 the shaft and the auger within the auger housing. The method 500 also includes blowing 504 snow using the auger within the auger housing. The method 500 further includes directing 506 the snow out of the auger housing using the chute. The method 500 also includes detecting 508 at least one of a rotational speed of the auger or the shaft and a load, torque, and/or thrust on the shaft or the auger housing using the at least one sensor. The method 500 further includes determining 510 the instantaneous flow rate of the snow using the data collected by the at least one sensor.

Thus, the systems and methods described herein calculate the flow rate of the snow blower by dividing the thrust determined by the second sensor 132 by the rotational speed of the auger determined by the first sensor 130. In this formulation, the thrust generated by the snow blower 104 launching a jet of snow is equal to the mass flow rate of the snow multiplied by the speed of the snow jet. The calculation is a direct physics-based measurement that automatically accounts for variability of the snow and provides for an instantaneous measurement which allows for a wide variety of data applications. Accordingly, the systems and methods described herein calculate instantaneous flow rate measurements of snow blown from the snow blower 104.

Embodiments of the present disclosure include methods and systems for snow blower flow rate sensors. More specifically, embodiments of the present disclosure include methods and systems for snow blower flow rate sensors using a direct physics-based measurement. Snow blower systems typically include a vehicle and a snow blower attached to the vehicle. The vehicle typically includes a drive train including an engine or motor and a plurality of gears, belts, shaft, and/or other components that transmit power from the engine to the snow blower. The snow blower also includes an auger, an auger housing, at least one bearing for rotatably maintaining the auger within the auger housing, and a chute for discharging snow from the auger housing.

The systems and methods described herein may accurately determine a flow rate of the snow blower by placing at least one sensor in the snow blower and determining the flow rate of the snow blower based on the at least one sensor. Specifically, the systems and methods described herein include a first sensor positioned proximate the at least one bearing for determining the thrust of the snow on the at least one bearing. The systems and methods described herein may further include a second sensor positioned proximate the auger that measures the rotational speed of the auger. The systems and methods described herein then calculate the flow rate of the snow blower by dividing the thrust determined by the first sensor by the rotational speed of the auger determined by the second sensor. This is a first-principles solution to measuring flow rate from a snow blower that is based on the integral form of the momentum equation in fluid dynamics which is simply a specific statement of Newton's 2nd law of motion. In this formulation, the thrust generated by the blower launching a jet of snow is equal to the mass flow rate of the snow multiplied by the speed of the snow jet. The systems and methods described herein are a direct physics-based measurement (as opposed to an empirical measurement with all the associated limitations) that automatically accounts for variability of the snow and provides for an instantaneous measurement which allows for a wide variety of data applications. Accordingly, the systems and methods described herein include a sensor for a snow blower that provides instantaneous flow rate measurements.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A snow blower comprising:
   an auger housing;
   an auger rotatably positioned within the auger housing and configured to blow snow;
   a shaft attached to the auger and the auger housing;
   a chute attached to the auger housing and configured to direct the snow blown by the auger away from the snow blower; and
   at least one sensor configured to detect:
      a rotational speed of the auger or the shaft; and
      a load, torque, and/or thrust on the shaft or the auger housing, wherein data collected by the at least one sensor is used to determine an instantaneous flow rate of snow.

2. The snow blower of claim 1, wherein the at least one sensor comprises a first sensor configured to detect the rotational speed of the auger or the shaft.

3. The snow blower of claim 2, wherein the first sensor is configured to detect the rotational speed of the shaft.

4. The snow blower of claim 2, wherein the first sensor is configured to detect the rotational speed of an edge of the auger.

5. The snow blower of claim 2, wherein the at least one sensor comprises a second sensor configured to detect a load, torque, and/or thrust on the shaft or the auger housing.

6. The snow blower of claim 5, wherein the second sensor is configured to detect a load, torque, and/or thrust on the shaft.

7. The snow blower of claim 5, wherein the second sensor is configured to detect a load, torque, and/or thrust on the auger housing.

8. The snow blower of claim 5, wherein the at least one sensor comprises a third sensor configured to detect an angle of the chute.

9. The snow blower of claim 1, further comprising a computing device configured to calculate the instantaneous flow rate of snow based on the data collected by the at least one sensor.

10. A snow blower system comprising:
   a vehicle; and
   a snow blower attached to the vehicle, the snow blower comprising:
      an auger housing;
      an auger rotatably positioned within the auger housing and configured to blow snow;
      a shaft attached to the auger and the auger housing;
      a chute attached to the auger housing and configured to direct the snow blown by the auger away from the snow blower; and
      at least one sensor configured to detect:
         a rotational speed of the auger or the shaft, and
         a load, torque, and/or thrust on the shaft or the auger housing, wherein data collected by the at least one sensor is used to determine an instantaneous flow rate of snow.

11. The snow blower system of claim 10, wherein the at least one sensor comprises a first sensor configured to detect the rotational speed of the auger or the shaft.

12. The snow blower system of claim 11, wherein the first sensor is configured to detect the rotational speed of the shaft.

13. The snow blower system of claim 11, wherein the first sensor is configured to detect the rotational speed of an edge of the auger.

14. The snow blower system of claim 11, wherein the at least one sensor comprises a second sensor configured to detect a load, torque, and/or thrust on the shaft or the auger housing.

15. The snow blower system of claim 14, wherein the second sensor is configured to detect a load, torque, and/or thrust on the shaft.

16. The snow blower system of claim 14, wherein the second sensor is configured to detect a load, torque, and/or thrust on the shaft.

17. The snow blower system of claim 14, wherein the at least one sensor comprises a third sensor configured to detect an angle of the chute.

18. The snow blower system of claim 10, further comprising a computing device configured to calculate the instantaneous flow rate of snow based on the data collected by the at least one sensor.

19. A method of determining an instantaneous flow rate of snow blown from a snow blower, the snow blower comprising an auger housing, an auger rotatably positioned within the auger housing and configured to blow snow, a shaft attached to the auger and the auger housing, a chute attached to the auger housing and configured to direct the snow blown by the auger away from the snow blower, and at least one sensor, the method comprising:
   rotating the shaft and the auger within the auger housing;
   blowing snow using the auger within the auger housing;
   directing the snow out of the auger housing using the chute;
   detecting:
      a rotational speed of the auger or the shaft using the at least one sensor; and
      a load, torque, and/or thrust on the shaft or the auger housing using the at least one sensor; and
   determining the instantaneous flow rate of the snow using the data collected by the at least one sensor.

20. The method of claim 19, wherein determining the instantaneous flow rate of the snow using the data collected by the at least one sensor comprises calculating the instantaneous flow rate of the snow using the data collected by the at least one sensor using a computing device.

* * * * *